July 23, 1968  R. E. REICHARD  3,393,945
FLUID PRESSURE DELIVERY VALVE
Filed June 10, 1966

INVENTOR.
ROBERT E. REICHARD
BY
ATTORNEY

United States Patent Office 3,393,945
Patented July 23, 1968

3,393,945
FLUID PRESSURE DELIVERY VALVE
Robert E. Reichard, South Bend, Ind., assignor to The
Bendix Corporation, a corporation of Delaware
Filed June 10, 1966, Ser. No. 556,758
11 Claims. (Cl. 303—6)

ABSTRACT OF THE DISCLOSURE

A valve for use in a compound hydraulic system such as a disc-drum brake system between an actuating cylinder and a hydraulic motor such as the master cylinder and the disc brake, having means to withhold pressure from the hydraulic motor, until the actuating cylinder has developed a predetermined pressure and thereafter with means in the valve to boost pressure to the hydraulic motor until another predetermined level of pressure is developed by the master cylinder whereafter the pressure delivered by the actuating cylinder is delivered directly to the hydraulic motor via by-pass passages in the valve.

---

This invention relates to a valve for controlling the delivery of fluid pressure and more particularly to a valve which will hold back the delivery of fluid pressure, thereafter deliver a boosted fluid pressure and finally deliver a fluid pressure that is equal to the pressure being supplied to the valve.

While this invention has many uses which can be appreciated by those skilled in the art, it was particularly conceived for a vehicle braking system, but it should be remembered by those skilled in the art to which the invention relates that it is equally applicable to aircraft and industrial hydraulic control systems utilizing single or multiple hydraulic fluid systems. With regard to the particular embodiment to be set out hereinafter by the inventor as regards a vehicle braking system, it has been observed that in automotive vehicles which utilize disc braking on the front wheels and drum braking on the rear wheels, that greater hydraulic pressure is required to expand the drum brakes into contact with the drums than that required to move the friction pads of the disc brakes into contact with the rotors. It is therefore deemed necessary to provide a means for holding off the supply of fluid pressure to the disc brakes during the expansion of shoes of the drum brakes in order that simultaneous actuation of both brakes may occur and provide the desired safe deceleration of the vehicle. Furthermore, it has been observed that after the shoes have been expanded to contact the drums of the rear wheels, the ratio of hydraulic input pressure to hydraulic output pressure for the disc brakes and the drum brakes should vary in order to provide the optimum deceleration of the vehicle.

It is a principal object of this invention to provide a valve device which will accomplish the above desired ends.

It is a more particular object of this invention to provide a valve device for a split type hydraulic braking system which is inserted in the hydraulic line from a master cylinder to the front brakes that will at first hold off the delivery of pressure to the front brakes, then provide a hydraulic pressure to the front brakes that is boosted with regard to input pressure and finally, provide a hydraulic pressure to the front brakes that is equal to the input pressure being delivered to the valve from the master cylinder.

Figure 1:
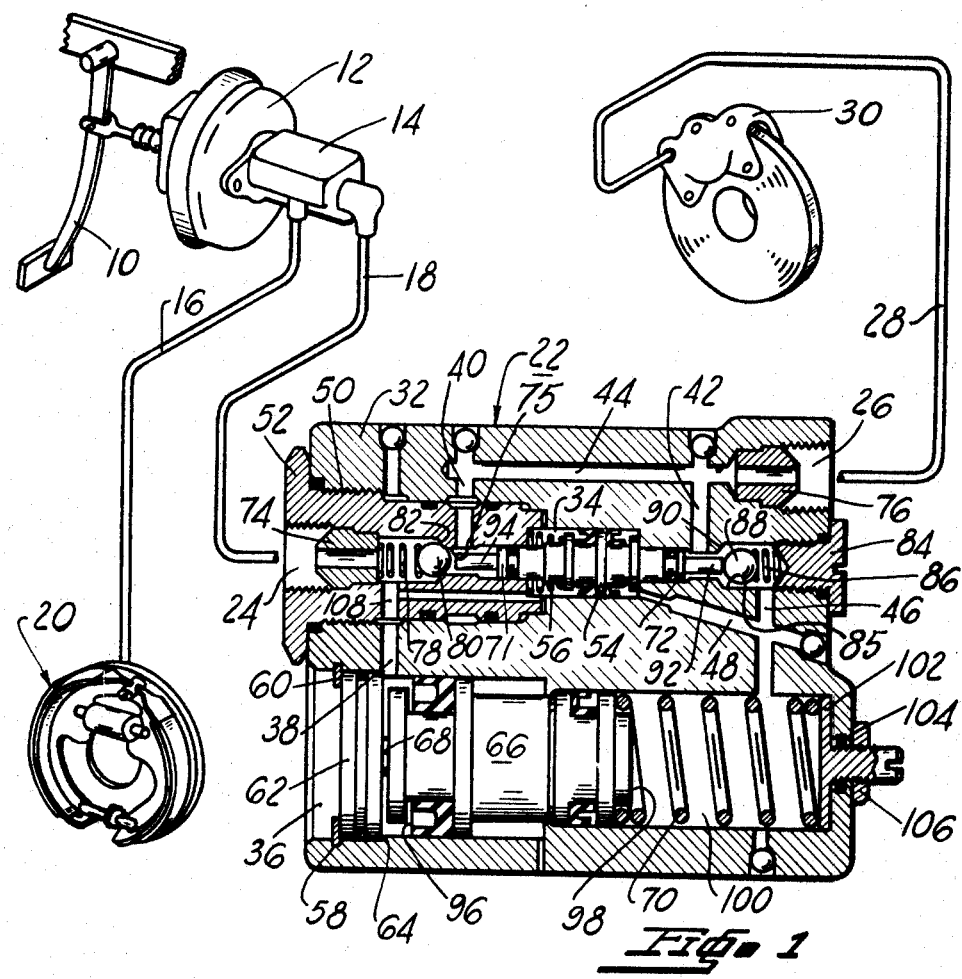
Figure 2:
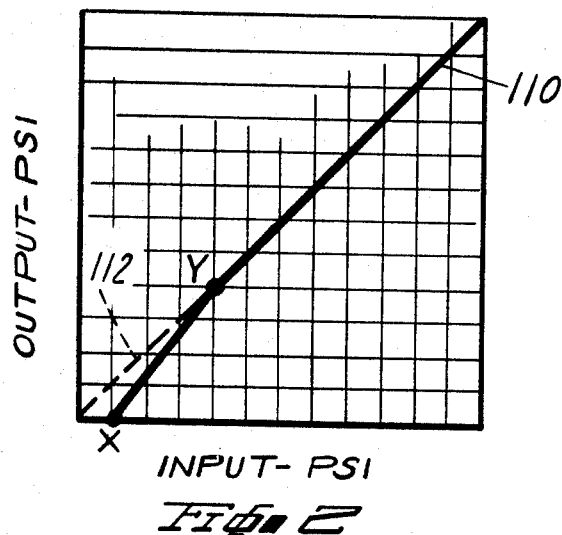

Other objects and advantages of this invention will appear from the following description of the drawings in which:

FIGURE 1 is a schematic brake system showing a valve in cross section constructed in accordance with the principles of my invention; and FIGURE 2 is a graph generally indicating the ratio of input to output pressure for both the front wheel brakes and the rear wheel brakes of a vehicle that utilizes these principles of my invention.

In more detail, and with regard to FIGURE 1, I have shown a typical vehicle braking system that includes a brake pedal 10, a servomotor 12 for actuating a split system type of master cylinder 14 that develops independent fluid pressures and delivers them to conduits 16 and 18. As seen, conduit 16 is connected to a drum type brake mechanism 20 which forms the rear wheel brakes of the associated vehicle; whereas the conduit 18 is connected to a valve device 22 at the inlet port 24. The valve device 22 has an outlet port 26 which is connected to a conduit 28 that leads to the front wheel brakes 30, which in this case are shown as being disc brakes.

The valve device 22 includes a housing 32 that is preferably cast with a valve chamber 34 and a piston chamber 36. After or during formation of the cast housing 32 it is then appropriately provided with passages 38, 40, 42, 44, 46 and 48. In addition, the valve chamber 34 is threaded, as at 50 to receive a plug 52 that mounts a valve piston 54 between a spring 56 and the housing 32. The stepped piston chamber 36 is grooved, as at 58, for the receipt of a snap ring 60 that locates a plug 62 against a shoulder 64 in the stepped piston chamber. A stepped piston 66 is inserted into the stepped piston chamber prior to the location of the plug 62. This piston has a projecting portion 68 that is biased by means of a hold-off spring 70 against the plug 62.

The valve piston 54 is also of step design so as to have smaller diameter ends 71 and 72 with an intermediate central body of larger area against which, at one side, the spring 56 is operatively in abutment. As may be appreciated within the inlet and outlet ports, ferrules 74 and 76 are respectively press fitted. The ferrule 74 has a bore 75 which is stepped to receive a valve means with ferrule 74 providing a bearing surface for a spring 78 that is compressed between a ball valve 80 and the ferrule 74. The ball valve 80, because of the spring 78, contacts a valve seat 82 within the inlet passage through the plug 52.

At the other side of the housing the valve chamber 34 is closed by means of a solid threaded plug 84 in bore 85 that also serves as a bearing member for a spring 86 that biases a ball valve 88 forwardly thereof to either contact a valve seat 90 or, as shown, a valve stem 92 projecting from the right face 72 of the valve piston 54. Similarly, the valve piston 54 is provided with a valve stem 94 projecting from the face 71.

Before passing on to the operation of my valve, it should be noted that the piston 66 is provided with a large face 96 subjected to inlet pressure being transmitted thereto by means of passage 38 and with a face 98 of lesser effective area than the face 96 for developing a boosted pressure within a chamber 100 in which the spring 70 is arranged. Also, it should be noted that, if desired, an adjusting plate 102 may be threaded through the housing 32 by an annular seal 104 and held in any position by means of an adjusting nut 106 in order to vary the load of the spring 70.

In operation, hydraulic pressure is developed in the master cylinder 14 upon depression of the brake pedal 10 to actuate the servomotor 12. This hydraulic pressure is essentially developed as two independent hydraulic pressures being fed to conduits 16 and 18 independently of each other, as will be appreciated by those skilled in the art of master cylinder constructions. The hydraulic pressure in the conduit 18 communicates with the passage 38 via the inlet port 24. As the ball valve 80 is upon the seat 82 this pressure passes, by means of a radial opening 108 in the plug 52 to the passage 38 and thence to the stepped chamber 36 behind the large face 96 of the piston 66. As the projection 68 is of essentially no consequence to the effect of the total area for the large face 96, it should be considered that this pressure is acting on substantially this entire area. Depending upon the preload of the spring 70, the piston 66 will initially be held from movement until the input pressure reaches a predetermined amount. After reaching a predetermined level the input pressure acting on the face 96 will translate the piston 66 to develop a boosted pressure within the chamber 100. This pressure is delivered to passages 46 and 48, and as the ball 88 is off the seat 90, it will flow directly to passage 42 and through the outlet port 26 to the disc brake 30. At the same time this pressure will be communicated through passage 48 to the valve chamber 34 and thereby oppose the action of the spring 56 in holding the valve piston 54 against tthe housing 32.

When the spring 56 is overcome by the boosted pressure from the chamber 100, the valve piston 54 will start moving to the left allowing the ball 88 to approach the seat 90. Thus, the projection 94 will abut against the ball 80 to unseat it from the seat 82 of the plug 52 whenever the output pressure in the chamber 100 has reached a predetermined amount. This will open the inlet port 24 through the passage 40 and 44 to the outlet port 26.

As there is a gradual transition from the boosted chamber 100 to the inlet port 24, at the outlet port 26, the boosted pressure from chamber 100 will be allowed to raise the inlet pressure so that there is no drop in the ratio of inlet pressure to outlet pressure during this transition.

Along these same lines the projection 68 being of very limited effective area will not create a substantial increase in volume in the stepped chamber 36 as the piston 66 moves away to compress the spring 70. Therefore, there will be no oscillation of the piston 66 which would tend to fluctuate the outlet pressure during the initial operation.

Now with reference to FIGURE 2, the above performance has been graphically illustrated so that the front brake pressure as depicted by the solid line 110 and the rear brake pressure as depicted by the dashed line 112 are quite different up to the point Y at which time the outlet pressure and the inlet pressure are equalized by my valve. The point X on this graph represents the delay in development of outlet pressure for the front wheel brakes. As seen, after a predetermined outlet pressure has been reached, as at the point Y, both the front and rear wheel brakes have a ratio of input pressure to output pressure that is equal.

Another important advantage of this invention is the fact that valve 80 is arranged so that thermal expension of hydraulic fluid in line 28 will permit the ball 80 to open to allow for relief of this pressure to the master cylinder.

Having fully described a particular embodiment of my invention in accordance with the patent law, I now wish to set forth the intended scope of protection sought by these Letters Patent.

I claim:

1. A means to regulate the delivery of fluid pressure, said means comprising a pressure regulating valve including:

a housing having an inlet port and an outlet port operatively connected by passage means in said housing;

a first pressure responsive means operatively arranged between said inlet and outlet ports in a portion of said passage means, said first means having first and second faces of different areas respectively exposed to fluid pressure from said inlet port and said outlet port;

a first resilient means between said housing and said first pressure responsive means to position said first means in said passage means;

a second pressure responsive means in another portion of said passage means having a large center body and smaller end faces each of which is provided with valve operating means, said another portion of the passage means including a first bore open to said inlet port and leading to one of said end faces, a second bore connected to said outlet port by passages to expose the other of the end faces to outlet pressure and to said one of said end faces, and intersecting passages one of which communicates one of said end faces of said first means to said second bore and another of which communicates said second bore to one side of said large center body of said second pressure responsive means;

a second resilient means between said housing and th eother side of said large center body for said second pressure responsive means with regard to the one side thereof communicated to said intersecting bores;

a first valve means arranged to normally prevent communication of said inlet port to said one of said end faces of said second pressure responsive means, which first valve means is placed ahead of the communication of said first bore with said second bore and operable by said valve operating means of the adjacent end face of said second pressure responsive means to open said inlet port to said first and second bores whenever the pressure on said larger center body overcomes said second resilient means as caused by inlet pressure on said first pressure responsive means overcoming said first resilient means; and a second valve means in said second bore and normally opening communication of said intersecting passages with said outlet port because of said valve operating means of said second pressure responsive means being biased by said second resilient means such that said communication is closed during the opening of said first valve means as aforedescribed.

2. A means to regulate the delivery of a fluid pressure according to claim 1 wherein said first pressure responsive means includes a projection of limited area on one of the first and second faces opposite that operatively connected to said first resilient means to prevent oscillation of said first pressure responsive means as it is urged by inlet pressure to compress said first resilient means, said projection acting as a stop between said housing and said first pressure responsive means which by having a small volume displacement reduces the increase of volume requirements as said first pressure responsive means moves away from said housing.

3. A means to regulate delivery of fluid pressure according to claim 2 wherein said first pressure responsive means has its first face of a larger effective area than said second face with said first face mounting said projection of limited area to space it from said housing to allow inlet pressure to be effective on nearly the total area thereof.

4. A means to regulate delivery of fluid pressure according to claim 3 wherein said smaller diameter second face is operatively connected to said first resilient means.

5. A means to regulate delivery of fluid pressure according to claim 4 wherein said resilient means is characterized as a compression spring whose rate is chosen to maintain said first pressure responsive means motionless until a predetermined inlet pressure is obtained at said inlet port.

6. A means to regulate the delivery of a fluid pressure according to claim 1 and further comprising conduit means connected to said inlet and outlet ports for connecting a pressure developing means to said inlet port and a pressure responsive motor to said outlet port.

7. A vehicle brake system comprising:

a hydraulic master cylinder operatively connected to a front wheel brake means and a rear wheel brake means; and a valve means operatively connected to said master cylinder between same and the front wheel brake means, said valve means including, a housing having an inlet port, an outlet port, a valve chamber and a stepped diameter chamber, a stepped diameter piston in said stepped diameter chamber having a projection of limited area affixed to its larger face, a spring in said stepped diameter chamber operatively connected to the small face of said stepped diameter piston, a valve piston in said valve chamber, a spring biasing said valve piston to abut one end of said valve chamber, passage means communicating the inlet port with said valve chamber and said stepped diameter chamber and said outlet port with said valve chamber and said stepped diameter chamber, normally open valve means operatively connected to said valve piston and located between said stepped diameter chamber and said outlet port, and normally closed valve means adapted to be opened by said valve piston as said normally open valve means is being closed, said normally closed valve means being located between said inlet port and said valve chamber.

8. A vehicle brake system according to claim 7 wherein said passage means includes a bypass bore for communicating opposite ends of said valve piston to equal pressure and upon closing of said normally open valve and opening of said normally closed valve for communicating said inlet port to said outlet port.

9. A vehicle brake system according to claim 8 wherein said passage means also includes a passage from said stepped diameter chamber, and more particularly the portion thereof in which the smaller face of the stepped diameter piston is effective, to the valve chamber to act on an intermediate area of said valve piston to oppose the spring biasing same so that after inlet pressure overcomes the spring on the stepped diameter piston to move same and develop a pressure for said outlet port that is proportionally greater than the inlet pressure, the valve piston moves to close the open valve and at a predetermined pressure open the closed valve whereupon inlet pressure and outlet pressure are equalized and thereafter increased at the same rate.

10. A brake pressure regulating valve comprising:

a compression spring to prevent pressure delivery below a predetermined inlet pressure, a means operatively connected to said compression spring to boost outlet pressure above inlet pressure above said predetermined inlet pressure, wherein said means is characterized as a stepped piston having a small area stop to permit inlet pressure to be effective on substantially the entire area of a larger face thereof and said piston is operatively connected to said spring at the smaller face thereof which after compression of the spring develops outlet pressure, the area of said stop being such as to preclude substantial variations of inlet volume capacity as it begins to operate to prevent fluctuation of outlet pressure during initial operation; and third means to equalize inlet and outlet pressures above a predetermined outlet pressure.

11. A brake pressure regulating valve according to claim 10 wherein said third means is characterized as including:

a first control valve;

a second control valve;

a piston normally arranged to hold the second control valve open and the first control valve closed and in fluid communication with the outlet pressure generated by the smaller face of the stepped piston to close the second control valve and open the first control valve above the predetermined outlet pressure to open bypass passages in said valve and equalize inlet and outlet pressures to and from said valve.

References Cited
UNITED STATES PATENTS

| | | | |
|---|---|---|---|
| 1,641,892 | 9/1927 | Lane | 137—524 XR |
| 1,651,778 | 12/1927 | Rice | 137—543.13 XR |
| 2,955,609 | 10/1960 | Gaubatz | 103—11 |
| 3,304,130 | 2/1967 | Doerfler | 303—6 |

MILTON BUCHLER, *Primary Examiner.*

J. J. McLAUGHLIN, *Assistant Examiner.*